July 21, 1964  K. U. SMITH  3,141,244
AUDIOVISUAL TEACHING DEVICE
Filed Nov. 15, 1961  3 Sheets-Sheet 1

INVENTOR.
KARL U. SMITH
BY
ATTORNEY

July 21, 1964 K. U. SMITH 3,141,244
AUDIOVISUAL TEACHING DEVICE
Filed Nov. 15, 1961 3 Sheets-Sheet 2
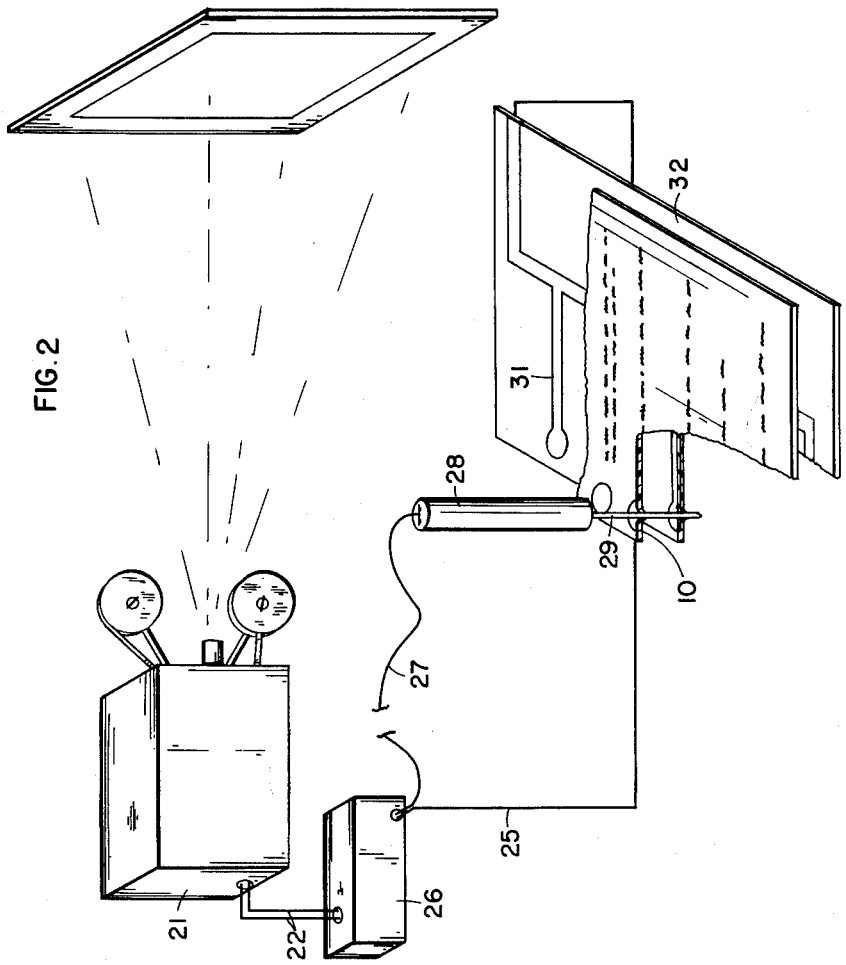
FIG. 2
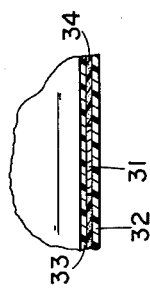
FIG. 3
INVENTOR.
KARL U. SMITH
BY 
ATTORNEY

INVENTOR.
KARL U. SMITH
BY
ATTORNEY

United States Patent Office 3,141,244
Patented July 21, 1964

3,141,244
AUDIOVISUAL TEACHING DEVICE
Karl U. Smith, 1915 Arlington Place, Madison, Wis.
Filed Nov. 15, 1961, Ser. No. 152,432
7 Claims. (Cl. 35—9)

This invention relates to an audiovisual teaching device and more particularly to such a device incorporating a stylus and a stylus-responsive answer key sheet.

Teaching devices heretofore proposed have been provided with switches which have been operated with such means as push buttons or toggle members or have been provided with means to permit the user of the device (student) to write answers in longhand.

Generally, audiovisual teaching devices comprise means for presenting material to be learned by conjointly operating visual and audio means such as, for example, a tape recorder or record player and a slide projector or a motion picture projector adapted to operate with sound film. Thus, material such as may be contained in a lecture may be broadcast or otherwise communicated to the student from a loudspeaker or microphone or the like and illustrations which may accompany the text are presented on a screen. The material may be presented to the user audially or visually, rather than by audio and visual means simultaneously. Means have been provided heretofore as a part of such audiovisual teaching machines to permit the student to stop the machine by pushing a button or throwing a toggle switch. Other such machines have been programmed so that when the student is presented with a question in the material, the machine stops itself. He may punch a button to indicate his answer; if the answer is correct, the machine may continue; if the answer is incorrect, the machine may start only after he closes a switch corresponding to a correct answer, or the machine may present material which it would not otherwise have presented.

Alternatively, machines previously proposed may be disposed to reverse and re-present the material leading up to the question if a switch is closed which corresponds to a wrong answer.

Other such machines have been programmed to present a question to the student and then stop while the student writes in longhand on a pad or sheet suitably provided. The student, when he has finished answering the question by writing in longhand, may then punch a button indicating that he has finished answering the question, and the machine may then proceed.

In accordance with my invention, an answer sheet is provided, which contains several possible answers to each of the questions to be presented by the machine, with a space alongside each possible answer. The answers may be relatively complex or may be very simple; they may consist of only one word, such as "true," "false," "yes," and "no.". A stylus is provided which is connected to the machine, and means are provided whereby the machine is caused to operate in response to punching the stylus in a space alongside an answer; the operation of the machine may depend upon whether the space punched corresponds to a correct answer or an incorrect answer.

The machine of my invention provides far greater flexibility and range in programming than machines previously proposed, and relatively complex programming can be accomplished with relatively great ease and at relatively low expense as compared with machines previously available. The machine may be programmed to respond in more ways to the student's actions in answering questions, with greater ease. A device is thus provided which may be simply programmed with relatively great economy and yet which may provide more responsiveness in the machine to the answer provided by the student than has been heretofore possible with machines of comparable simplicity.

It is therefore an object of the invention to provide an improved audiovisual teaching machine.

Another object is such a machine which may be complexly programmed with relatively great ease.

Another object is such a machine, adapted to complex programming, which is relatively economical.

Another is such a machine which may be made relatively highly responsive to answers provided by a user with relatively little complexity in the machine and with great economy in construction.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 2 is a partially cross-sectional, partially cutaway, partially schematic view of another embodiment;

FIGURE 3 is a fragmentary, cross-sectional, view of a portion of one embodiment;

Figure 1:
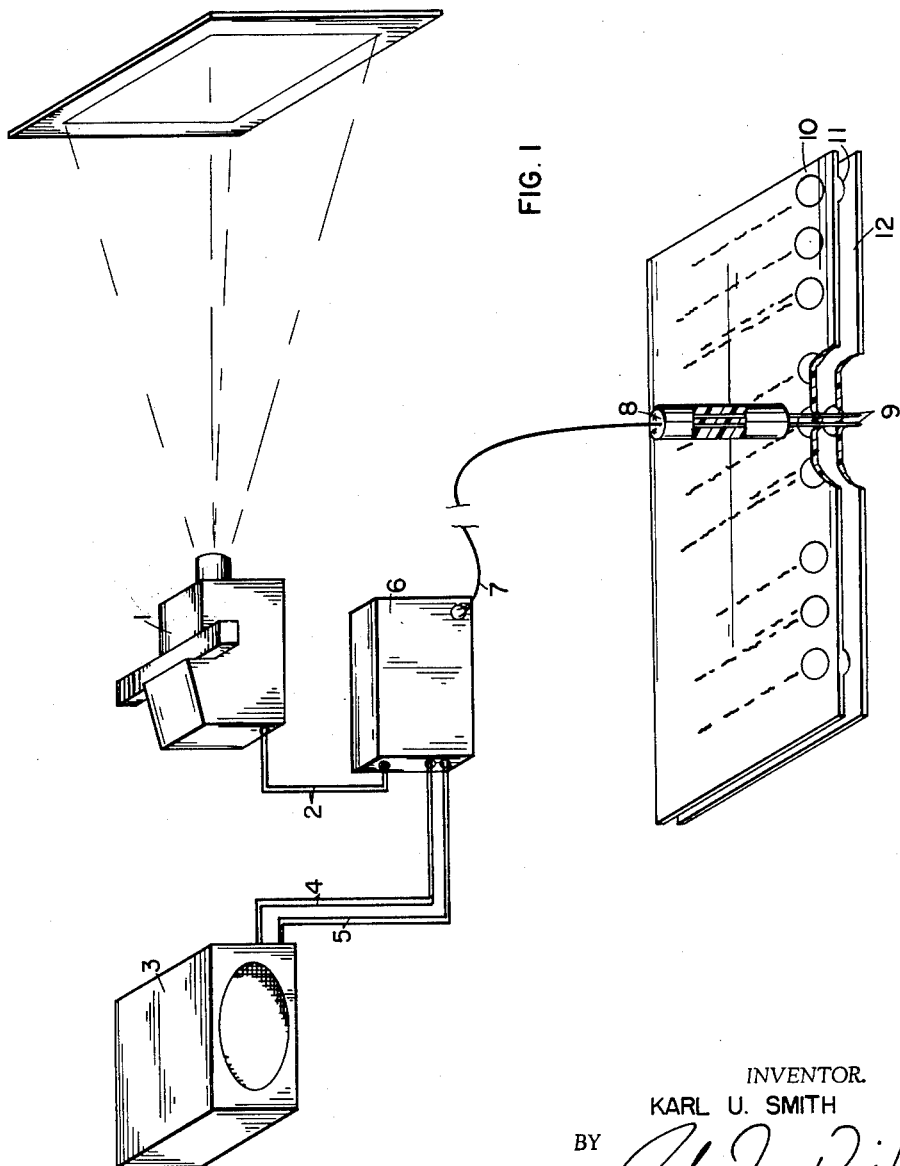
FIGURE 1 is a partially cross-sectional, partially cutaway, partially schematic view of one embodiment.

Referring now to FIGURE 1, there is shown one embodiment which comprises electrically operated projector 1, which may be a slide projector, motion picture projector, or other projector adapted to provide a visual display and to operate or stop operating in response to signals sent through wires 2, audio speaker unit 3, which may be a record player, magnetic tape "recorder," wire "recorder," or other means for removing an audio signal from an audio storage device such as a record, magnetic tape, magnetic wire or the like, an amplifier and a loud speaker or microphone to create an audio signal which may be heard by the operator, unit 3 being adapted to start or stop in response to electrical signals introduced through wires 4 and, if desired, to transmit signals through wires 5 in response to which unit 1 may start or stop. Means for supplying electrical power which is required to operate units 1 and 3 is not shown, for simplicity. Electrical signals sent through wires 2 or 4 may start or stop units 1 or 3 respectively by operating relays which operate switches to close or open circuits to connect said units with such power supply means, in well known manner.

Control box 6 may contain an amplifier and relays which, in well known manner, may be adapted to cause units 1 and 3 to start or stop in response to a signal received through wires 7 from stylus 8. Each of wires 7 may be connected to one of probes 9, which may be suitably punched through a chosen portion of answer sheet 10 and may contact conductive material 11 on answer sheet 12. Probes 9 are of conductive material, such as metal. Material 11 may be a conductive ink or paint, such as may be provided by a composition which comprises carbon particles or silver particles in a suitable vehicle. When probes 9 encounter conductive material 11, a circuit is closed between them and a current may flow in wire 7, which may serve as a signal to operate suitable relays in unit 6, to either start or stop units 1 and 3.

Sheet 10 is preferably a flexible, foldable material and must be a puncturable material.

As shown in FIGURE 2, a teaching machine in accordance with the invention may comprise projector 21, which may be a motion picture projector, adapted to start or stop in response to signals transmitted through wires 22 from control unit 26. Wire 27 may connect probe 29 of stylus 28 to unit 26, and wire 25 may connect conductive material 31 on key or answer sheet 32 with unit 26. When probe 29 is thrust through question sheet 10, into contact with conductive material 31, a circuit is closed through wires 27 and 25 so that if a small E.M.F. is applied to either of them, a current flows in the circuit; the current may serve as a signal to operate suitable relays within unit 26 to start or stop projector 21.

Figure 4:
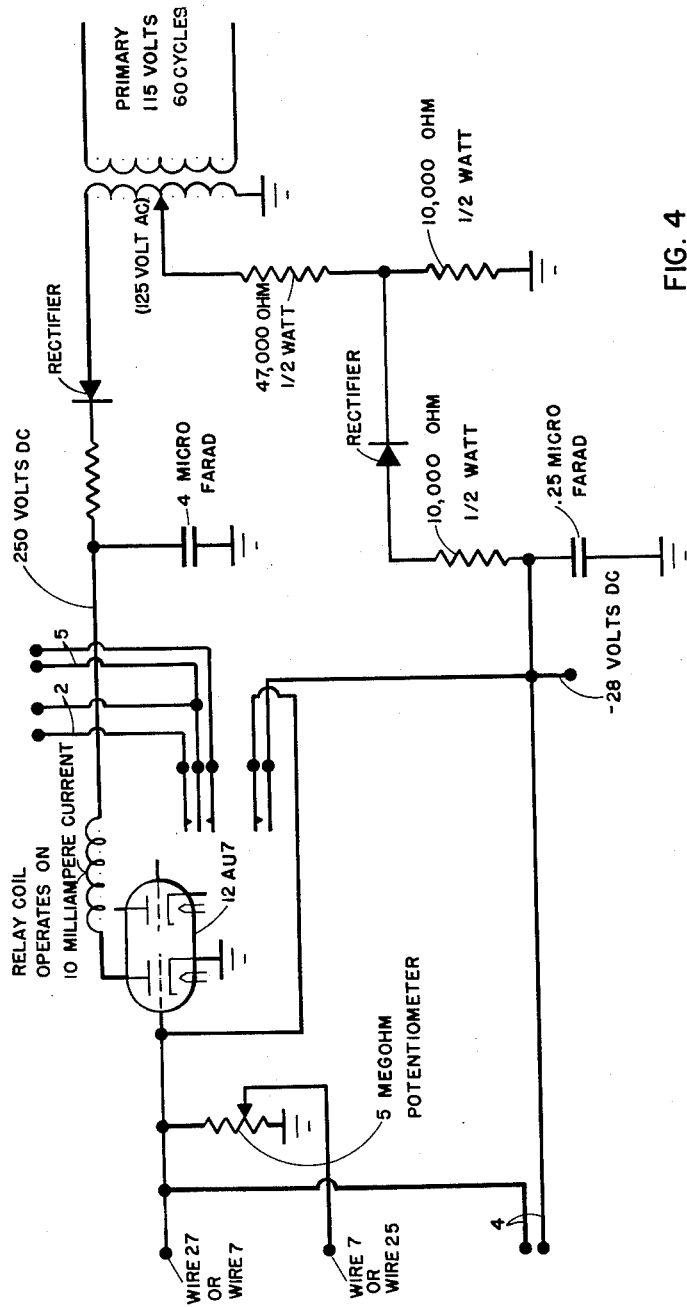
FIGURE 4 is a schematic view of the circuitry of the embodiment of FIGURE 1.

Probe 8 may be used with unit 26 and projector 21, and probe 28 may be used in place of probe 8 in the apparatus of FIGURE 1. Projector 21 is preferably provided with a sound unit to handle film which carries a sound track, so that it provides both a visible display and audio signal to the operator. Thus, the device contains an electronic control unit which is used to stop the tape recorder automatically after a question has been asked, and to start it again when the student correctly marks the answer to the previous question on an answer sheet. This unit is shown in FIGURE 4.

The device can give an illustrated lecture, with slides automatically presented at the proper time, and can also ask questions which must be answered correctly by the student before he can proceed. The machine can also direct the student to write an answer to a short essay question, the correct answer to which is summarized by the machine when the student finishes writing and punches his answer sheet for a second question. Generally, the machine can be made to automate any aspect of the teaching function except spontaneous give-and-take between lecturer and class. Even in this area, the machine can be used to record such spontaneous give-and-take, and play it back to the individual student or class.

The control unit is a small amplifier-relay which is sensitive to very small signal voltages and will control fairly heavy load currents. This basic control relay has been perfected over a period of some years in research on electronic methods of human motion analysis. The relay can be activated by contacts placed on the mangetic tape to control the operations of the slide projector or the motor of the tape recorder. One circuit in the device is connected to the motor of the tape recorder, and to the special electrode stylus used by the student. Contacts on one side of the magnetic tape activate this signal circuit and stop the tape recorder. When the student marks an answer sheet correctly, the tape recorder starts up again. Thus the machine can be made to stop automatically after asking a question, and proceed with the next question after the student has punched the correct response on the answer sheet with his stylus.

One of the big advantages of the teaching machine of the invention is that the teacher can make up his own answer sheets and keys. The alternative multiple-choice answers to the questions asked by the machine may be printed on a sheet of paper by either ditto or mimeograph process, and answer spaces may be provided beside these statements. To make a key, the teacher may merely blacken the spaces on one sheet corresponding to the correct answers with conductive material. This sheet is placed below the answer sheet. When the student punches the answer sheet correctly, contact of his stylus with the graphite of the marked key (below the answer sheet) completes the circuit of the audiovisumatic control and starts the tape recorder which then asks another question and stops automatically, all as discussed in connection with FIGURE 1.

In addition to the types of controls already described, the control unit can be connected to timers, counters, mechanical registers, or markers in order to obtain quantitative data on time, errors, and correct responses of students in relation to various methods and procedures of teaching. Thus, such techniques can be used in educational research to evaluate variable elements of the teaching situation. Type of voice, rate of talking, difficulty of material, integration of visual-aural material, programming of special courses, pretesting of new courses—all of these can be tested quantitatively by use of the machine of the invention.

The overall effectiveness of teaching can be judged in terms of how well it conforms to desirable educational procedures as well as certain other practical considerations. In general, the machine is a flexible device which can be used at its best to provide highly varied, stimulating, and provocative classroom situations. Some of the different uses to which this machine can be adapted are the following: the use of recorded lectures and selected visual materials by experts in special fields and other well-known persons (the advanced students listed this as a highly desirable characteristic); interplay between the teacher and recordings of his own lecturers; teacher-machine discussions; illustrated lecture review; various types of student-controlled programmed tutoring; use of recordings of related sounds and sights in nature; and playback of visually illustrated sounds of music and human communication.

An important consideration in assessing the significance of the devices of the invention is how they compare with motion pictures and television in classroom use. From the teacher's point of view, the machine does a better job of teaching because it duplicates so well the normal teaching functions and has a flexibility in use not achieved by motion pictures or television. The machine is very economical, both to build and to use. The materials needed to prepare lectures, magnetic tapes, slides, and filmstrips, are cheap and easily available. Teachers need no technical training either to prepare their own illustrated lectures, to run the machines, or to prepare programmed material for individual tutoring.

An important feature of the device is that programming may be relatively simply accomplished by the teacher or programmer. He may provide suitable signals on the record, magnetic tape or sound track to stop the presentation whenever he pleases; normally, the presentation is stopped after a question is presented. He may easily provide sheets which carry the questions he wants to present to the student on the question sheets by typing, photo off-setting, or other offset printing or other handy and well-known means. He may provide key sheets or answer sheets simply by blackening, with conductive material, suitable areas on an answer sheet which correspond to spaces to be punched on a question sheet which correspond to correct answers. In using the key sheet or answer sheet of FIGURE 2, it is necessary to provide a track or line of conductive material leading from each area which corresponds to a correct answer to the point at which wire 25 is connected. Sheet 10 may be of paper or plastic or other suitable non-conductive material which will allow probe 9 or 29 to be thrust therethrough. Answer sheet 12 or 32 is preferably of similar material, that is, material through which probe 9 or 29 will pass without great difficulty, but may be of elastomeric material such as rubber or of relatively heavy plastic through which the probe will not pass, it being sufficient in order to establish contact that the probe or probes establish good contact with conductive material 11 or 31.

If a space corresponding to a wrong answer is punched, the presentation will not be re-started; therefore, it is necessary for the student to continue to punch spaces until he starts the machine. In scoring the test, the teacher or instructor will observe the punched marks produced in the spaces corresponding to erroneous answers. If the student starts the machine by punching a space which he has punched in response to a previous question, which he knows from experience will start the machine, the absence of punch marks in any of the spaces corresponding to an answer to the question he should have punched may be scored by the instructor as a failure to answer the question at all.

Thus, it may be seen that additional conductive areas might be provided on the answer or key sheet connected to a separate control unit which, rather than starting the machine, would indicate that a wrong answer has been punched. Thus the test could be scored automatically, with the exception that failure to punch any space corresponding to any answer to a particular question would not be shown in this way, and the sheet would have to be checked subsequently to make sure that some answer had been punched for each question.

The machine may be used for testing as well as teaching.

As shown in FIGURE 3, upper layer of non-conductive material 33 may be fastened with adhesive 34 to sheet 32 carrying conductive material 31 in certain areas. This may be done to prevent the student from observing visually the areas on the answer or key sheet which he should punch in order to make certain of indicating a correct answer.

The answer or key sheet 12 or 32 must preferably underlie and be in proper register with sheet 10, while the device is in operation.

The probe is preferably of relatively rigid conductive material adapted to puncture the sheet of flexible, foldable material and to establish contact with conductive material 11 or 31. It need not puncture or be able to puncture sheets 12 or 32, but if sheets 12 or 32 are provided with layer 33 in accordance with FIGURE 3, it must be capable of puncturing layer 33 to establish such contact. The conductive material has generally been described as resilient and puncturable, but it need not be. It may be, for example, a sheet or layer of metal which may be provided on a rigid plastic sheet 32 or 12.

Layer 33 must be opaque and sheet 10 must be opaque if layer 33 is not provided. Layer 33 may be a coating, such as of titanium oxide suspended in a vehicle rather than being a layer of paper adhered with adhesive 34. Layer 33 need not be attached with adhesive 34, or other suitable means, except at the edges. It may, for example, be attached to sheet 32 with a frame, which holds the two sheets together at their edges by clamping action or the like. Even a series of paper clips may be used or a series of staples around the edges of the two sheets.

Referring now to FIGURE 4, it may be seen that the voltage and amperage in the probe circuit, when the circuit is closed, are suitably from −12 volts to −150 volts and from .00000014 ampere to .000030 ampere, preferred values being from −15 volts to −30 volts and from .0000030 ampere to .0000060 ampere.

It may thus be seen that the invention is broad in scope and includes such modifications as will be apparent to those skilled in the art and is to be limited only by the claims.

Having thus described my invention, I claim:

1. A teaching and testing device comprising the combination of:

power operated presentation means to present teaching and question material to a student, which operates in response to closing and opening of a circuit;

a control unit to operate said means in response to a signal received by said unit as a result of closing a circuit which communicates therewith;

a sheet of puncturable, flexible, foldable, non-conductive material having areas which correspond to correct answers to questions propounded in said material presented by said presentation means;

a sheet of non-conductive material having its upper surface underlying said sheet of flexible, foldable material, portions of said upper surface which correspond to correct answers being covered with conductive material;

a probe of relatively rigid conductive material adapted to puncture said sheet of flexible foldable material and contact said conductive material;

means to provide a closed circuit to pass current from said said control unit through said probe and through said conductive material back to said control unit while said probe is in contact with said conductive material.

2. The device of claim 1 wherein said means to provide a closed circuit comprises a second probe adapted to puncture said sheet of flexible, foldable material and contact said conductive material.

3. The device of claim 2 wherein both of said probes are contained in a single stylus.

4. The device of claim 1 wherein said means to provide a closed circuit comprises additional areas of conductive material on the upper surface of said sheet of non-conductive material having its upper surface underlying said sheet of flexible, foldable material.

5. The device of claim 1 wherein the upper surface of said sheet which has conductive material on said surface is covered with an opaque layer which covers said conductive material.

6. The device of claim 1 wherein said presentation means comprises a slide projector and a magnetic tape recorder.

7. The device of claim 1 wherein said presentation means comprises a motion picture projector.

References Cited in the file of this patent

UNITED STATES PATENTS

| | | |
|---|---|---|
| 2,546,666 | Fleischer | Mar. 27, 1951 |
| 2,835,052 | Raich et al. | May 20, 1958 |
| 2,943,400 | Griswold | July 5, 1960 |
| 2,953,859 | Fink | Sept. 27, 1960 |
| 2,985,069 | Sampson | May 23, 1961 |